Aug. 23, 1960     R. F. COOK ET AL     2,949,662
METAL CUTTING TOOLS
Filed Nov. 25, 1957

INVENTORS
RAYMOND F. COOK &
PAUL G. CLINE
BY Ely, Frye & Hamilton
ATTORNEYS

United States Patent Office 2,949,662
Patented Aug. 23, 1960

2,949,662

METAL CUTTING TOOLS

Raymond F. Cook and Paul G. Cline, Cuyahoga Falls, Ohio; said Cline assignor to said Cook Filed Nov. 25, 1957, Ser. No. 698,579

4 Claims. (Cl. 29—96)

The present invention relates to metal working cutters of the inserted blade type. More particularly, the invention relates to metal cutting tools utilizing cemented carbide products to provide cutting edges or surfaces.

The advantages of cemented carbide products, preferably in the form of prismatic bits, in the metal cutting art are well known. Machines using carbide cutting inserts may be driven at great speeds and high feed rates. Carbide inserts will cut a wide range of metals and alloys in roughing or finishing operations. Carbide inserts are also well suited for plunge and interrupted cutting, and if properly secured or held by the toolholder, will be unaffected by sand inclusions or hard spots on castings or by highly abrasive steels.

In the present state of this art, the performance of the cemented carbide cutting inserts, per se, is extremely satisfactory. Manufacturers of carbide cutting inserts provide a diversified number of grades and qualities, special shapes, forms, etc., one of which is well suited for any specific cutting job. It is, however, in the field of carbide toolholders that improvement is needed. The shank or mounting member of a toolholder for carbide inserts must resist deformation, burring, chip, erosion, etc., and is usually a heat treated alloy steel. Of even greater importance is the provision of a correct "seat" for the carbide insert. Carbide has great strength under a compression load. However, it is somewhat brittle and will readily fracture if subjected to uneven stress or a tension load.

A satisfactory toolholder also must permit the insert to be indexed or replaced, must allow for the use of a chip breaker which can be adjusted or indexed, and should have the minimum of undershank or overhang for accuracy of the cut. Heretofore, all of these requirements have been met only by the use of specially designed, complicated, and expensive toolholders. For example, there are straight turning tools, offset tools, facing tools, plunge turning tools, all provided with various rake, lead and clearance angles. In practice, the necessity of providing a special tool for each type of cut has added greatly to the cost of machining operations.

Accordingly, it is an object of the present invention to provide an improved concept in toolholders for cemented carbide cutting inserts by using a standard insert mounting assembly which can readily be attached to a shank or support and adapted for use as a straight turning tool, an offset tool, a facing tool, a plunge turning tool, etc., at any desired "cutting angle," which term includes the rake, lead and clearance angles of the toolholder.

Further, it is an object to provide a standard mounting assembly for carbide cutting inserts which will provide and maintain a correct "seat" for the insert at a predetermined cutting angle, which will permit the insert to be accurately and securely indexed or quickly replaced, which will provide for the use and adjustment of a chip breaker, all with a minimum of undershank or overhang.

These and other objects of the invention, as well as additional advantages thereof, will be apparent in view of the following detailed description and the drawings.

In the drawings:

Fig. 4 is an end view taken as indicated on Fig. 3;

Figure 1:
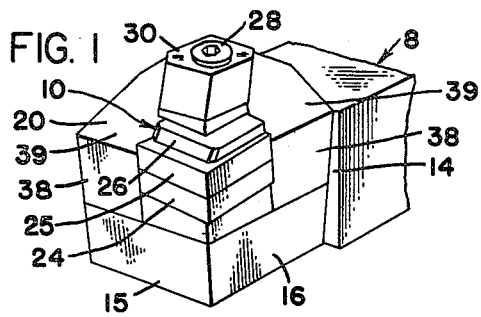
Fig. 1 is a perspective view looking toward the cutting side of a carbide insert mounting assembly according to the invention, secured to the end of a shank.
Figure 3:
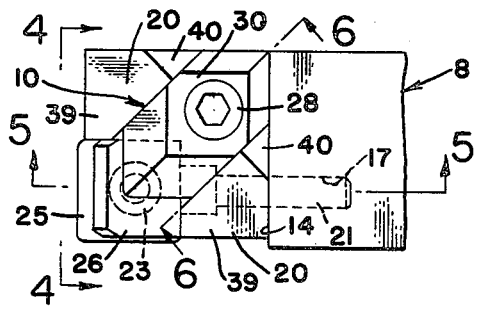
Fig. 3 is a top view of a carbide insert mounting assembly.

A metal cutting tool according to the invention may be regarded as having two principal parts. The support or shank of the tool is indicated generally by the numeral 8, is made from a suitable high strength steel, heat treated if necessary, and is adapted for attachment to a machine tool (not shown) in any suitable manner. The mounting assembly for a cemented carbide cutting insert is indicated generally by the numeral 10 and is secured to the working end of the shank 8 as described in detail below.

The working end of the shank 8 has a full width flat surface 12 extending longitudinally from the end of the shank to a right angle intersection with a wall 14 extending transversely the full width of the shank. The outer face 15 at the end of the shank and intersecting side face 16 are preferably both slightly inclined to provide desirable cutting clearance angles. For purposes as described below, the wall 14 has a tapped bore 17 therein. The flat surface has a large tapped bore 18 and a smaller tapped bore 19 at diagonal corners thereof.

The cutting insert mounting assembly 10 has a block 20, a block bolt 21 (for threading in bore 17), a rake wedge 22, a wedge screw 23 (for threading in bore 19), carbide inserts 24 and 25, a chip breaker 26, a dual-thread clamping bolt 28 (the lower threads being threadable in bore 18), and a clamp 30.

The basic component of the cutting insert mounting assembly 10 is the L-shaped block 20 having similar, preferably symmetrical, angularly opposed halves. The symmetrical halves are on opposite sides of a plane bisecting the block at the apex thereof.

Each half of block 20 has an outer surface 32 intersecting the other at exact right angles at the apex or outer corner 33. Each block half has an inner surface 34 intersecting the other at an inner corner 35. The inner surfaces 34 define the side walls of a "seat" for the carbide inserts 24 and 25. In the form of invention shown, the carbide inserts are square. Accordingly, the inner surfaces intersect in corner 35 at a 90° angle and each is parallel with the corresponding outer surface 32. It will also be noted (see Fig. 5) that the "seat" provided by the inner surfaces 34 is inclined downwardly providing a negative rake for the cutting edge of the upper insert 25.

Each half of block 20 has a flat under surface 36 extending between the surfaces 32 and 34. The intersection of surface 36 with surface 32 is at a right angle. The intersection of surface 36 with surface 34 is at an angle of 90° plus the additional slight angle of the negative rake. The end surfaces 38 of each block half also extend between the surfaces 32 and 34 and preferably are inclined downwardly at the same angle as faces 15 and 16 of the shank 8.

The upper side of each half of block 20 has a large surface area 39, inclined toward an end surface 38, and a smaller surface area 40, inclined toward an outer surface 32. The purpose of the inclined areas 39 and 40 is to provide the maximum amount of clearance for the mounting assembly without sacrificing the strength of the block 20. The upper edges of the areas 39 and 40 terminate along a wall 41. The two walls 41 define the side surfaces of a guide slot for the clamp 30. The bottom of such slot is formed by the flat surfaces 42, which intersect on the plane bisecting the block between the outer and inner corners, 33 and 35.

The block 20 is secured to the wall 14 of the shank 8 by the bolt 21. The bolt 21 is selectively inserted through one of two plain bores 43 extending between surfaces 32 and 34 and aligned with the tapped bore 17. In the form of the invention shown, the bores 43 are countersunk adjacent surface 34 to provide a seat for the Allen-head bolt 21.

The block 20 is positioned on the surface 12 of the shank by the dual-thread bolt 28. The bolt 28 is inserted through a larger plain bore 44 extending between surfaces 36 and 42 and aligned with the tapped bore 18.

In the form of invention shown, the carbide inserts 24 and 25 are square. Accordingly, the rake wedge 22 is square having a flat upper surface 45 inclined toward an outer corner 46 and at an exact right angle with the inner surfaces 34. The degree of inclination of surface 45 determines the rake angle afforded for the cutting edge of the upper insert 25 in relation to the block 20. The wedge is secured to the surface 12 of the shank 8 by the screw 23. The screw 23 is inserted through a countersunk plain bore 47 aligned with the tapped bore 19.

In the form of invention shown, only the upper carbide insert 25 is used to cut. The lower insert 24 is provided for the primary reason of providing an absolutely flat seat for the upper insert 25, regardless of the particular rake angle being employed. A secondary reason for the lower insert is that it provides a readily accessible or spare insert. Further, the lower insert need not have sharp edges, only flat surfaces, and therefore a used insert can satisfactorily be employed.

The chip breaker 26 performs a function well known to those skilled in this art. It will suffice to say that the chip breaker is preferably of cemented carbide composition having a bevelled edge 49 and is indexed in relation to the cutting insert 25 as dictated by the requirements of the metal being cut.

In the form of invention shown, the clamping bolt 28 has longitudinally separate threads, preferably of opposite hand. The lower thread area 51 is for example, right handed, and extends through the plain bore 44 for insertion in the tapped bore 18. The upper thread area 52 is opposite hand and is inserted in the tapped bore 54 of the clamp 30.

The clamp 30 has opposed sidewalls 53 which fit snugly in the slot defined by the walls 41 and surfaces 42 of the block 20. The upper surface of the clamp has a tapped bore 54 engaging the upper threads 52 of the clamping bolt 28. The forward surface of the clamp has identical inclined areas 55 which merge smoothly with the adjacent areas 39 of the block 20. The rear of the clamp has smaller inclined areas 56 which merge smoothly with the areas 40 of the block. As with areas 39 and 40, the exact configuration of areas 55 and 56 is not critical so long as a maximum amount of clearance for the cutting mount is provided with minimum sacrifice of strength.

Figure 5:
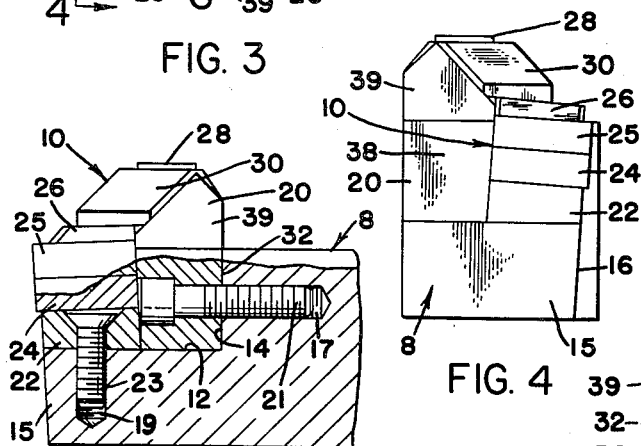
Fig. 5 is a sectional view taken substantially as indicated on Fig. 3.
Figure 6:
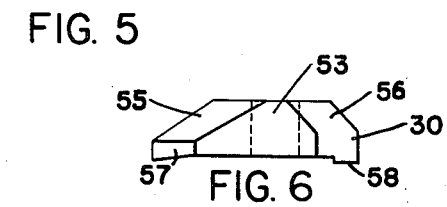
Fig. 6 is a full elevation of the chip breaker clamp of the insert mounting assembly, taken diagonally as indicated on Fig. 3; and, Fig. 7 is a plan view of a modified shank for securing an insert mounting assembly.

Referring to Fig. 5, the forward edge of the clamp 30 terminates in an apex area having an under surface 57 which is inclined at a slight angle toward the center of the clamp. The rear edge of the clamp 30 has a small depending area 58. The purpose of areas 57 and 58 is to ensure that the clamp 30 will tightly yet resiliently clamp the chip breaker and cutting inserts.

Figure 7:
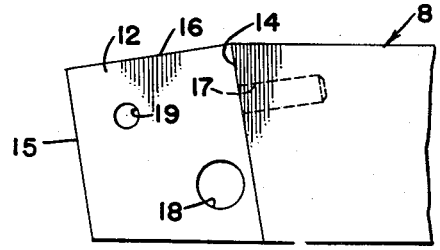
Figure 2:
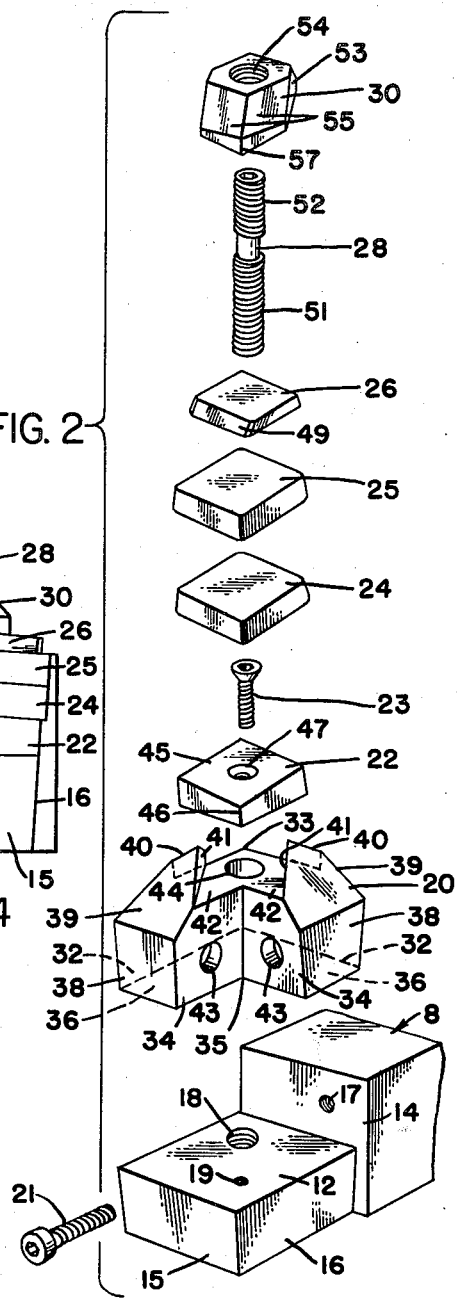
Fig. 2 is an exploded view illustrating the several components of a carbide insert mounting assembly.

A metal cutting tool according to the invention is constructed in the following manner:

(a) The shank 8 is prepared from suitable stock. The user mills the surface 12 and the wall 14 at exact right angles to each other. The angular relation of the surface 12 and wall 14 to the longitudinal axis of shank 8 determines the lead angle and if desired, the rake angle. The surfaces 15 and 16 are milled or ground to provide the desired clearance angle. In Fig. 2, the end of the shank has been prepared for a left hand turning tool with a 0° lead angle. In Fig. 7, the shank has been prepared for a right hand turning tool with a 7° lead angle.

(b) The user then takes the disassembled block 20 and sets it on the surface 12 against the wall 14. The block 20 is then clamped and the bores 17 and 18 are tapped using the appropriate bore 43 and the bore 44 as die holes. The wedge 22 is then placed against the surfaces 32 and bore 19 is tapped using bore 47 as the die hole.

(c) The user then secures the block 20 against wall 14 of the shank by inserting bolt 21 through bore 43 into the bore 17. The wedge 22 is then secured against surface 12 of the shank by inserting screw 23 through bore 47 into the bore 19. The bolt 28 is inserted through bore 44 and the lower threads 51 are started into bore 18. The clamp 30 is then aligned with the upper threads 52 and the bolt 28 is turned until the upper threads are started. The lower insert 24 is then placed atop or on the wedge surface 45. The upper insert 25 is placed on the lower insert and the chip breaker 26 is placed on the upper insert in the desired location. Finally, the screw 28 is tightened until the clamp 30 is secured against the chip breaker. To replace insert 25 or index the chip breaker 26, the bolt 28 is backed off slightly and the adjustment is easily performed.

In actual practice, the inventors envisualize that the mounting assemblies 10 will be made in advance by skilled machinists and distributed to the trade as a standard or catalog item. Any given mounting assembly 10 may be used right or left hand at any reasonable cutting angle, which includes the rake, lead, and clearance angles. In the form of invention shown, it will be noted that the nature of the rake, negative or positive, and the degree thereof, may be determined by the inclination of surfaces 32 of the block and surface 45 of the wedge. For example, in the drawings, the insert 25 is seated with a 5° negative rake. The surfaces 15, 16, and 38 have a similar cutting clearance angle. Thus, the mounts 10 may be made "standard" for any given rake.

It has been found that the concept of the invention as described is applicable to insert mounting assemblies having either negative or positive, side or back rake of any practicable degree. However, a rake angle of 5° to 7° is satisfactory for most cutting operations.

Since the mounting assemblies 10 can thus be supplied in "standard" forms, the user thereof is required to perform only the relatively simple operations described above in preparing the end of shank 8 for attachment of the mounting assembly. The need for separate conventional tools for each type of cutting job is eliminated.

It should now be apparent that the inventors have made a substantial improvement in the art of metal cutting tools. It should also be apparent that slight modifications, other than as described above, could be made in the cutting insert mounting assembly 10 without departing from the spirit of the invention. For example, the inserts 24 and 25 could be round, triangular or otherwise prismatic in shape, or the chip breaker 26 could be eliminated when machining soft metals. Further, the mounting assemblies 10 could be adapted for use on a rotary cutter or other type of tool so long as the shank or "support" afforded at least two intersecting surfaces similar to surfaces 12 and 14.

What is claimed is:

1. A metal cutting tool, comprising: a shank having at least two flat intersecting surfaces, an L-shaped block seated against said surfaces and having symmetrical halves on opposite sides of a plane bisecting said block at the apex thereof, each block half including an outer surface conforming with one of said shank surfaces, an under surface conforming with another of said shank surfaces, an inner surface defining the edge portion of a seat for a metal cutting insert, and a top surface defining a portion of a slot extending between said inner surfaces and the apex of the block; a wedge seated against said block inner surfaces on one of said shank surfaces and having an upper surface providing a seat for a metal cutting insert; means securing said block and said wedge to said shank surfaces; at least one cutting insert seated on said wedge upper surface in contact with said block inner surfaces; and clamp means in said block slot projecting over said wedge securing the insert on said wedge upper surface.

2. A tool holder for a metal cutting insert, comprising: a shank having at least two flat intersecting surfaces; an L-shaped block seated against said surfaces and having symmetrical halves on opposite sides of a plane bisecting said block at the apex thereof, each block half including an outer surface conforming with one of said shank surfaces, an under surface conforming with another of said shank surfaces, an inner surface defining the edge portion of a seat for a metal cutting insert, and a top surface defining a portion of a slot extending between said inner surfaces and the apex of the block; a wedge seated against said block inner surfaces on one of said shank surfaces and having an upper surface providing a seat for a metal cutting insert; means securing said block and said wedge to said shank surfaces; and clamp means in said block slot projecting over said wedge for securing an insert on said wedge upper surface.

3. A positioning block for insertable bit tool holders, comprising, an L-shaped block having symmetrical halves on opposite sides of a plane bisecting said block at the apex thereof, each block half having a flat outer surface intersecting a flat under surface at a right angle, and, an inner surface intersecting said flat under surface, said last named intersection being parallel to said outer surface.

4. The positioning block of claim 3 wherein the inner surface is parallel to said outer surface.

References Cited in the file of this patent

UNITED STATES PATENTS

| | | |
|---|---|---|
| 1,104,980 | Fry | July 28, 1914 |
| 1,346,056 | Poulain | July 6, 1920 |
| 1,476,262 | Marshall | Dec. 4, 1923 |
| 1,537,957 | Marshall | May 19, 1925 |
| 2,716,800 | Bader | Sept. 6, 1955 |
| 2,734,256 | Forward | Feb. 14, 1956 |
| 2,791,825 | Greenleaf | May 14, 1957 |
| 2,808,638 | Filippi | Oct. 8, 1957 |
| 2,848,789 | Friedline | Aug. 26, 1958 |
| 2,854,735 | Dukes | Oct. 7, 1958 |
| 2,887,760 | Armstrong | May 26, 1959 |
| 2,903,781 | Huelson | Sept. 15, 1959 |

FOREIGN PATENTS

| | | |
|---|---|---|
| 667,676 | Great Britain | Mar. 5, 1952 |
| 200,882 | Australia | Feb. 15, 1956 |